United States Patent
Hartinger et al.

(10) Patent No.: US 10,102,109 B2
(45) Date of Patent: Oct. 16, 2018

(54) EXCEPTION RESOLUTION IN A SOFTWARE DEVELOPMENT SESSION

(71) Applicant: Red Hat, Inc., Raleigh, NC (US)

(72) Inventors: Jozef Hartinger, Prague (CZ); Lincoln Baxter, III, Charlotte, NC (US); Joshua R. Kinlaw, Garner, NC (US); Ian P. Hands, Asheville, NC (US)

(73) Assignee: Red Hat, Inc., Raleigh, NC (US)

( * ) Notice: Subject to any disclaimer, the term of this patent is extended or adjusted under 35 U.S.C. 154(b) by 28 days.

(21) Appl. No.: 15/168,587

(22) Filed: May 31, 2016

(65) Prior Publication Data
US 2017/0344460 A1 Nov. 30, 2017

(51) Int. Cl.
G06F 9/44 (2018.01)
G06F 11/36 (2006.01)
H04L 12/58 (2006.01)

(52) U.S. Cl.
CPC ........ G06F 11/3664 (2013.01); H04L 51/046 (2013.01)

(58) Field of Classification Search
CPC ............. G06F 11/3664; G06F 11/0772; G06F 7/49905; G06F 2209/481; H04L 51/046
USPC ........................................................ 717/125
See application file for complete search history.

(56) References Cited

U.S. PATENT DOCUMENTS

| | | | |
|---|---|---|---|
| 5,845,125 A | 12/1998 | Nishimura et al. | |
| 6,339,832 B1 * | 1/2002 | Bowman-Amuah | ... G06F 9/542 714/35 |
| 6,434,628 B1 * | 8/2002 | Bowman-Amuah | ... H04L 29/06 714/48 |
| 7,343,529 B1 | 3/2008 | Klinkner et al. | |
| 7,895,470 B2 | 2/2011 | Nastacio et al. | |
| 7,984,220 B2 | 7/2011 | Gerard et al. | |
| 8,028,203 B2 * | 9/2011 | Chellam | ............... G06F 11/327 714/57 |
| 8,112,677 B2 | 2/2012 | Barlow et al. | |
| 8,407,724 B2 | 3/2013 | Niazi | |

(Continued)

FOREIGN PATENT DOCUMENTS

WO    WO 2017134677 A1 *  8/2017  .............. G06F 11/36

OTHER PUBLICATIONS

Xu et al., "Concurrent Exception Handling and Resolution in Distributed Object Systems", Oct. 2000, IEEE, vol. 11, No. 10.*

(Continued)

Primary Examiner — Wei Zhen
Assistant Examiner — Junchun Wu
(74) Attorney, Agent, or Firm — Withrow & Terranova, PLLC

(57) ABSTRACT

Mechanisms for exception resolution in a software development session are provided. An exception is detected during a software development session. Information regarding the exception is provided to a central exception repository computing device. The information includes exception information that identifies the exception and a first user identifier that identifies the first user. A second user identifier that identifies a second user who has encountered a same exception is received from the central exception repository computing device. Information is presented to the first user that identifies the second user. A communication session between the first user and the second user is facilitated.

13 Claims, 7 Drawing Sheets

(56) References Cited

U.S. PATENT DOCUMENTS

| | | | |
|---|---|---|---|
| 8,881,113 B2* | 11/2014 | Zheng | G06F 11/0709 717/127 |
| 9,110,803 B2* | 8/2015 | Archer | G06F 11/0793 |
| 9,740,593 B2* | 8/2017 | Boxall | G06F 8/70 |
| 2001/0025373 A1 | 9/2001 | Gebhart et al. | |
| 2006/0070037 A1* | 3/2006 | Canning | G06F 11/34 717/127 |
| 2006/0294158 A1 | 12/2006 | Tsyganskiy et al. | |
| 2007/0011689 A1 | 1/2007 | Hiraoka | |
| 2007/0164849 A1 | 7/2007 | Haeberle et al. | |
| 2007/0174731 A1 | 7/2007 | Haeberle et al. | |
| 2007/0234270 A1* | 10/2007 | Cohen | H04L 41/048 717/100 |
| 2008/0034351 A1 | 2/2008 | Pugh et al. | |
| 2009/0013208 A1* | 1/2009 | DiMuzio | G06F 9/4812 714/57 |
| 2009/0106729 A1 | 4/2009 | Adi et al. | |
| 2009/0327809 A1 | 12/2009 | Joy et al. | |
| 2010/0077385 A1* | 3/2010 | Flores Assad | G06F 11/3664 717/129 |
| 2010/0211932 A1* | 8/2010 | Jones | G06F 8/20 717/124 |
| 2011/0154300 A1 | 6/2011 | Rao et al. | |
| 2013/0332907 A1 | 12/2013 | Warren et al. | |
| 2015/0052503 A1 | 2/2015 | Ligman et al. | |
| 2015/0082277 A1 | 3/2015 | Champlin-Scharff et al. | |
| 2015/0095892 A1 | 4/2015 | Baggott et al. | |
| 2015/0193329 A1* | 7/2015 | Strode | G06F 11/0709 717/125 |
| 2016/0014059 A1* | 1/2016 | Rathod | H04L 12/1818 715/752 |
| 2016/0078439 A1* | 3/2016 | Vanska | G06Q 30/0633 705/44 |
| 2016/0299807 A1* | 10/2016 | Tanabe | G06F 11/32 |
| 2016/0330156 A1* | 11/2016 | Dunne | H04L 51/12 |

OTHER PUBLICATIONS

Wei et al., "Exception Resolution Service for RBAC systems", 2007, IEEE.*

Monson et al., "IBM Workplace for Business Strategy Execution", Jun. 2006, IBM.com/redbooks.*

Ahmed, Mostafa M. et al., "Predicting Bug Category Based on Analysis of Software Repositories," 2nd International Conference on Research in Science, Engineering and Technology (ICRSET'2014), Mar. 21-22, 2014, Dubai (UAE), pp. 44-53.

Morris, Simon, "7 Benefits of Using a Known Error Database (KEDB)," The ITSM Review, Apr. 16, 2012, 13 pages, http://www.theitsmreview.com/2012/04/7-benefits-of-using-a-kedb/.

Non-Final Office Action for U.S. Appl. No. 15/168,617, dated Oct. 5, 2017, 20 pages.

Non-Final Office Action for U.S. Appl. No. 15/168,617, dated May 10, 2018, 22 pages.

* cited by examiner

EXCEPTION RESOLUTION IN A SOFTWARE DEVELOPMENT SESSION

TECHNICAL FIELD

The examples relate generally to software development and, in particular, to exception resolution in a software development session.

BACKGROUND

Software development can be a complex, time-consuming, and expensive process. Complex software modules may have thousands, hundreds of thousands, or even millions of lines of instructions. Exception messages are sometimes issued by compilers or during runtime of the corresponding executable to identify problems in the software.

SUMMARY

The examples relate to exception resolution in a software development environment. In one example, a method is provided. The method includes monitoring, by a computing device comprising a processor device, a software development session of a first user. The method further includes detecting an exception during the software development session. The method further includes providing, to a central exception repository computing device, information regarding the exception, the information comprising exception information that identifies the exception and a first user identifier that identifies the first user. The method further includes receiving, from the central exception repository computing device, a second user identifier that identifies a second user who has encountered a same exception. The method further includes presenting, via a user interface on a display device coupled to the computing device, information to the first user that identifies the second user and includes facilitating a communication session between the first user and the second user.

In another example, a computing device is provided. The computing device includes a memory and a processor device coupled to the memory. The processor device is to monitor a software development session of a first user, and detect an exception during the software development session. The processor device is further to provide, to a central exception repository computing device, information regarding the exception, the information comprising exception information that identifies the exception and a first user identifier that identifies the first user. The processor device is further to receive, from the central exception repository computing device, a second user identifier that identifies a second user who has encountered a same exception, and present, via a user interface on a display device coupled to the computing device, information to the first user that identifies the second user. The processor device is further to facilitate a communication session between the first user and the second user.

In another example, a computer program product is provided. The computer program product is stored on a non-transitory computer-readable storage medium and includes instructions to cause a processor device to carry out steps of monitoring a software development session of a first user and of detecting an exception during the software development session. The instructions further cause the processor device to carry out steps including providing, to a central exception repository computing device, information regarding the exception, the information comprising exception information that identifies the exception and a first user identifier that identifies the first user. The instructions further cause the processor device to carry out steps including receiving, from the central exception repository computing device, a second user identifier that identifies a second user who has encountered a same exception. The instructions further cause the processor device to carry out steps including presenting, via a user interface on a display device coupled to the computing device, information to the first user that identifies the second user, and facilitating a communication session between the first user and the second user.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
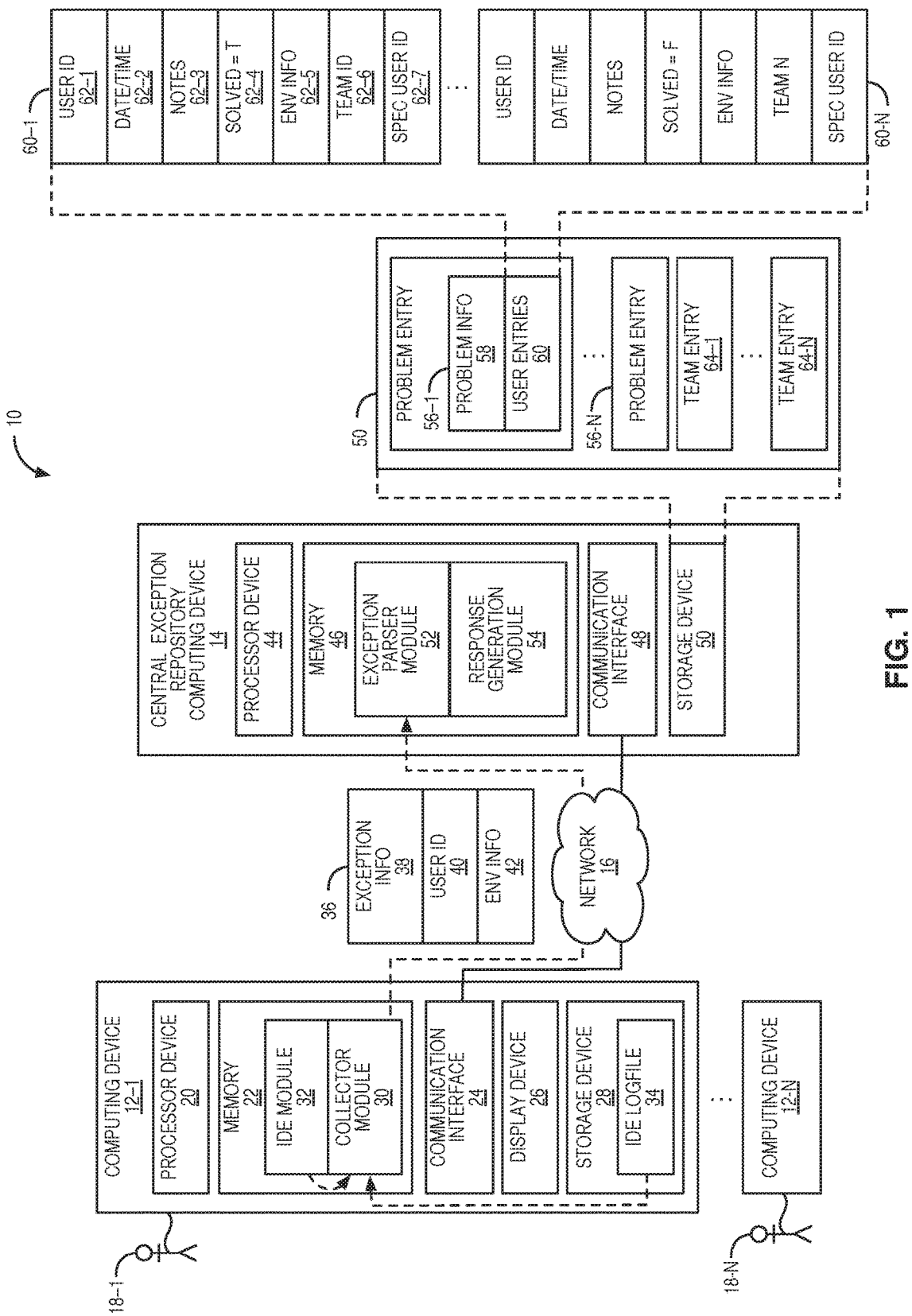
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Software development is a complex process typically performed by relatively highly compensated individuals. Software development is typically an iterative process that involves multiple stages. One stage involves writing the necessary software instructions. Complex software modules may have thousands, hundreds of thousands, or even millions of lines of instructions. Software compilers and interpreters require every instruction to conform to a particular syntax and to be internally consistent. A single typographical or logical exception in one line of instructions can lead to an exception being reported somewhere else in the lines of instructions. Often exception messages issued by compilers or interpreters are not helpful in identifying what caused the exception. This may be similarly true during the run-time stage. Even if the software instructions successfully compile, the resulting executables may cause exceptions.

Determining what caused an exception in order to move past the exception can be time-consuming. It can take hours or even days to determine the reason for an exception. This is costly and extends the development cycle. The examples resolve these and other issues by leveraging the experiences of multiple software developers over time and facilitating communications between software developers who have encountered the same exception. In particular, exceptions from a group of users, such as software developers, are automatically identified and stored in a central repository. When a user encounters an exception, such as a compiler exception by way of non-limiting example, the exception is automatically detected and forwarded to the central repository. The central repository analyzes the exception and determines that one or more other users, sometimes referred to as second users, has encountered the same exception. The central repository returns the identity of the one or more other users, and the computing device automatically facilitates a communication session with the one or more other users. Among other advantages, the examples can greatly reduce the amount of time, and therefore cost, associated with resolving an exception.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first user" and "second user," and does not imply a priority, a type, an importance, or other attribute, unless otherwise stated herein. As used herein and in the claims, the articles "a" and "an" in reference to an element refers to "one or more" of the element unless otherwise explicitly specified.

FIG. 1 is a block diagram of an environment 10 in which examples may be practiced. The environment 10 includes a plurality of computing devices 12-1-12-N (generally, computing devices 12) and a central exception repository (CER) computing device 14. The computing devices 12 and the CER computing device 14 may communicate with each other via one or more networks 16. The computing devices 12 are operated by corresponding software developers, referred to herein as users 18-1-18-N.

The computing device 12-1 includes a processor device 20, a memory 22, a communication interface 24, a display device 26, and a storage device 28. In some examples, the processor device 20 may implement all or portions of the functionality discussed herein via programming instructions. For example, the memory 22 may contain one or more program modules, such as a collector module 30, that is executed by the processor device 20 to implement all, or portions, of the functionality described herein. While for purposes of illustration only a single collector module 30 is illustrated, it will be appreciated that functionality described herein may be implemented by any number of different modules depending on a desired system architecture. Because the collector module 30 is a component of the computing device 12-1, functionality implemented by the collector module 30 may generally herein be attributed to the computing device 12-1. Moreover, in examples where the collector module 30 comprises software instructions that program the processor device 20 to carry out functionality discussed herein, functionality implemented by the collector module 30 may generally herein be attributed to the processor device 20. In other examples, functionality provided by the collector module 30 may be implemented in hardware, such as a special purpose processor, an application specific integrated circuit (ASIC), or the like.

The communication interface 24 facilitates communications with the CER computing device 14 and other computing devices 12 via the network 16. The display device 26 allows the user 18-1 to provide input to the computing device 12-1, and facilitates the presentation of information to the user 18-1. The storage device 28 stores persistent data. Although not illustrated to conserve space in the Figures, the other computing devices 12 may be similarly or identically configured.

The user 18-1 interacts with a development module, such as an integrated development environment (IDE) module 32, during a software development session. The IDE module 32 facilitates the development of software by the user 18-1. The IDE module 32 may comprise any suitable IDE, such as, by way of non-limiting example, Red Hat® Developer Studio®, Red Hat JBoss® Enterprise Application Platform, Microsoft® Visual Studio®, Oracle® Jdeveloper, IBM® Rational® Application Developer, or the like. As the user 18-1 interacts with the IDE module 32, the IDE module 32 may generate an exception. The phrase "exception" herein refers to an event generated during the software development session by the IDE module 32, or by another component of the computing device 12-1, that indicates a deviation from normal processing. An exception may arise at a number of different stages during the software development process, including, for example, during a compilation stage and/or during an execution stage. An exception may comprise, by way of non-limiting example, a syntax error, a syntax warning, a run-time error, a data corruption error, an error indicating incorrect usage of a third-party library, a network communication error, or the like.

The collector module 30 monitors aspects of the computing device 12-1, such as the software development session of the user 18-1, and/or programs that are executing, aspects of the operating system, the network, and the like. The collector module 30 may monitor the software development session in one or more ways. The collector module 30 may interact directly with the IDE module 32 and/or other modules executing on the computing device 12-1 via an inter-process communication mechanism such as, by way of non-limiting example, an application programming interface or a socket. Alternatively, in some examples, the collector module 30 may be integrated into the IDE module 32 and be a component of the collector module 30. In other examples, the collector module 30 may be a plug-in that is invoked by the IDE module 32 at runtime. When the IDE module 32 generates an exception, the IDE module 32 may notify the collector module 30 of the exception. In addition, or alternatively, the collector module 30 may continuously monitor output of the IDE module 32, such as an IDE logfile 34 to which the IDE module 32 logs generated exceptions.

After the collector module 30 detects an exception, the collector module 30 provides information 36 regarding the exception to the CER computing device 14. In some examples, this may take place automatically and transparently to the user 18-1, without any user input from the user 18-1. The information 36 may comprise, by way of non-limiting example, exception information 38 that identifies the exception. The exception information 38, for example, may comprise any suitable information that identifies the exception. For example, the exception information 38 may comprise a unique identifier issued by the IDE module 32, and/or textual information issued by the IDE module 32. The information 36 may also include a user identifier 40 that identifies the user 18-1. The information 36 may also include environmental information 42 that identifies a current operating environment of the computing device 12-1. The environmental information 42 may include both static and dynamic information about the computing device 12-1 at the time of the exception, such as the number and type of processor devices 20, a quantity of the memory 22, a size of the storage device 28, the number of running processes in the memory 22, the names of the processes, a processor utilization of the processor device 20, recently accessed webpages, recently changed source code files, diagnostic information associated with runtime processes, and the like.

The CER computing device 14 includes a processor device 44, a memory 46, a communication interface 48, and a storage device 50. In some examples, the processor device 44 may implement all or portions of the functionality discussed herein via programming instructions. For example, the memory 46 may contain one or more program modules, such as an exception parser module 52 and a response generation module 54, that is executed by the processor device 44 to implement all, or portions, of the functionality described herein. Because the exception parser module 52 and the response generation module 54 are components of the CER computing device 14, functionality implemented by the exception parser module 52 and the response generation module 54 may generally herein be attributed to the CER computing device 14. Moreover, in examples where the exception parser module 52 and the response generation module 54 comprise software instructions that program the processor device 44 to carry out functionality discussed herein, functionality implemented by the exception parser module 52 and the response generation module 54 may generally be attributed herein to the processor device 44. In other examples, functionality provided by the exception parser module 52 and the response generation module 54 may be implemented in hardware, such as a special purpose processor, an application specific integrated circuit (ASIC), or the like.

Generally, the exception parser module 52 receives exception information from the computing devices 12 over time, processes each occurrence of exception information to identify a problem, and generates and stores problem entries 56-1-56-N (generally, problem entries 56) in the storage device 50. The problem entries 56-1-56-N each contain information about a particular problem. In some examples, each unique exception may correlate to an independent problem. In other examples, a problem may be identified by a number of different exceptions, and thus multiple different exceptions may all indicate the same problem.

In this example, the exception parser module 52 receives the information 36 and processes the exception information 38. The exception parser module 52 also accesses the problem entries 56 in the storage device 50. If the exception parser module 52 determines that the exception information 38 identifies a previously unknown problem, the exception parser module 52 generates and stores a new problem entry 56 in the storage device 50 based on the information 36, such as the user identifier 40 and the environmental information 42. If the exception parser module 52 determines that the problem identified by the exception information 38 identifies a known problem, the exception parser module 52 modifies the existing problem entry 56 that identifies the known problem to include all or portions of the information 36, such as the user identifier 40 and the environmental information 42.

For purposes of discussion, assume that the exception parser module 52 determines that the exception information 38 identifies a problem that corresponds to the problem entry 56-1. The problem entry 56-1 includes problem information 58 and one or more user entries 60-1-60-N. The problem information 58 contains information about the problem, such as one or more unique identifiers of exceptions that correspond to the problem entry 56-1, and/or textual information regarding the exceptions, such as may be contained in the exception information 38. The problem information 58 may be used, among other purposes, by the exception parser module 52 to determine if exception information received from a computing device identifies a known problem or a new problem.

The user entries 60-1-60-N identify information about the users who have encountered the problem that corresponds to the problem entry 56-1. For example, the user entry 60-1 may correspond to the first user 18 that encountered the problem, and the user entry 60-1 may include a user ID field 62-1 that contains a user ID that identifies such user. A date/time field 62-2 may identify a date and/or time of occurrence of the exception. A notes field 62-3 may contain information that the user provided regarding the exception. A solved flag field 62-4 may indicate whether or not the user ultimately solved the exception. An environmental information field 62-5 may contain the environmental information 42 provided by the user that identifies the current operating environment of the corresponding computing device 12 at the time of the exception. A team ID field 62-6 may identify a development team of which the user is a member. In some examples, a highly-skilled specialist may be associated with a user, and identified in a specialist user ID field 62-7. Some or all of the information contained in the fields 62-1-62-7 may be contained in the information 36 provided to the CER computing device 14 when an exception is detected by a computing device 12.

In some examples, the exception parser module 52 may generate a new user entry 60 each time the same user encounters the exception, to facilitate keeping track of how many times each user has encountered the exception. In this particular example, the exception parser module 52 generates a new user entry 60, such as the user entry 60-N based on the information 36 received from the computing device 12-1. Some of the fields 62-1-62-6 may be empty if the information 36 did not contain information suitable for such fields 62-1-62-6.

The response generation module 54 generates a response, if appropriate, to the computing device 12-1 in response to the receipt of the information 36. In particular, the response generation module 54 may generate a response if other users 18 have encountered the same exception. The response, in one example, may comprise user identifiers of the other users 18 who have encountered the same exception. The response may also include, for example, any notes obtained from the notes field 62-3 of the corresponding user entry 60-1, information indicating that the other user(s) has solved the exception based on the solved flag field 62-4, information that identifies the dates and/or times that the other user(s) encountered the exception based on the date/time field 62-2, and environmental information about the other user(s) operating environment based on the environmental information 62-5.

In some examples, the storage device 50 may contain a plurality of team entries 64-1-64-N, which identifies teams of users 18. In some examples, the response generation module 54 may limit the identification of other users 18 who have encountered the same exception to those users 18 who are on the same team as the user 18-1.

The response generation module 54 sends the response to the computing device 12-1. As will be discussed in greater detail herein, but discussed in brief now for context, the computing device 12-1 receives the response from the response generation module 54 and presents, via a user interface on the display device 26, information to the user 18-1 that identifies the other user(s) 18 who have encountered the same exception. The computing device 12-1 also automatically facilitates a communication session between the user 18-1 and the other user(s) 18 who have encountered the same exception.

In some examples, the CER computing device 14 may facilitate textual queries against the problem entries 56 by the users 18 who are not necessarily contemporaneous with the occurrence of an exception. In such examples, the CER computing device 14 may receive a query from a computing device 12 that contains keywords, and based on the keywords, search the problem entries 56. The CER computing device 14 may then return information from those problem entries 56 that identifies information that a user 18 may find useful in resolving exceptions.

Figure 2:
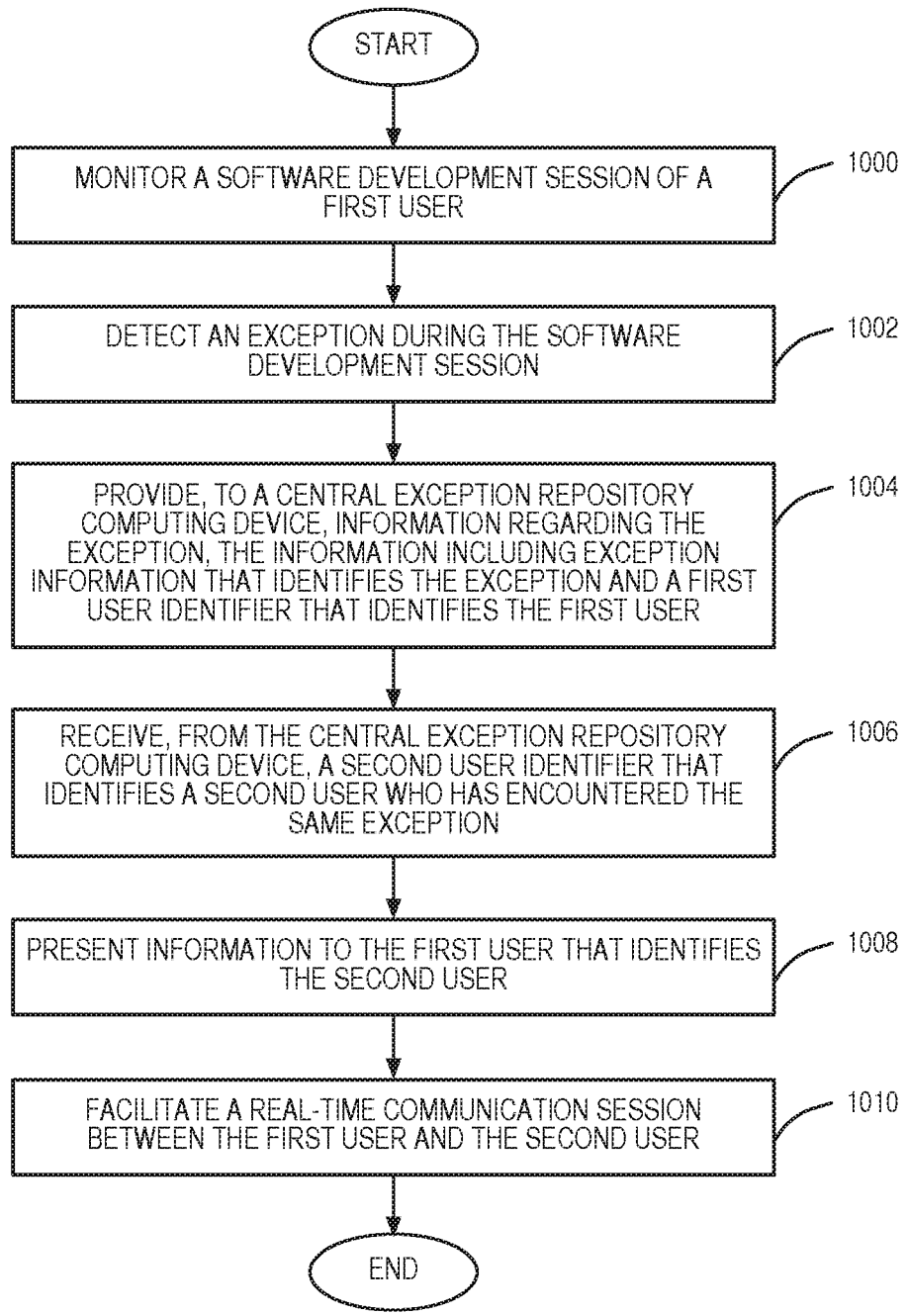
FIG. 2 is a flowchart of a method for exception resolution in a software development session, according to one example.

FIG. 2 is a flowchart of a method for exception resolution in a software development session, according to one example. FIG. 2 will be discussed in conjunction with FIG. 1. The processor device 20, via the collector module 30, monitors the software development session of the user 18-1 (block 1000). The processor device 20 detects an exception during the software development session (block 1002). By way of non-limiting example, the processor device 20 monitors the software development session of the user 18-1 in part by continuously analyzing the IDE logfile 34 generated by the IDE module 32. The processor device 20 detects the exception during the software development session by detecting that the IDE logfile 34 contains information that identifies an exception.

The processor device 20 provides, to the CER computing device 14, the information 36 regarding the exception. The information 36 includes the exception information 38 that identifies the exception and the first user identifier 40 that identifies the user 18-1 (block 1004). The processor device 20 receives, from the CER computing device 14, a second user identifier that identifies a second user 18 who has encountered the same exception (block 1006). The processor device 20 presents, via a user interface on the display device 26, information to the user 18-1 that identifies the second user 18 (block 1008). The processor device 20 also facilitates a communication session between the user 18-1 and the second user 18 (block 1010).

Figure 3A:
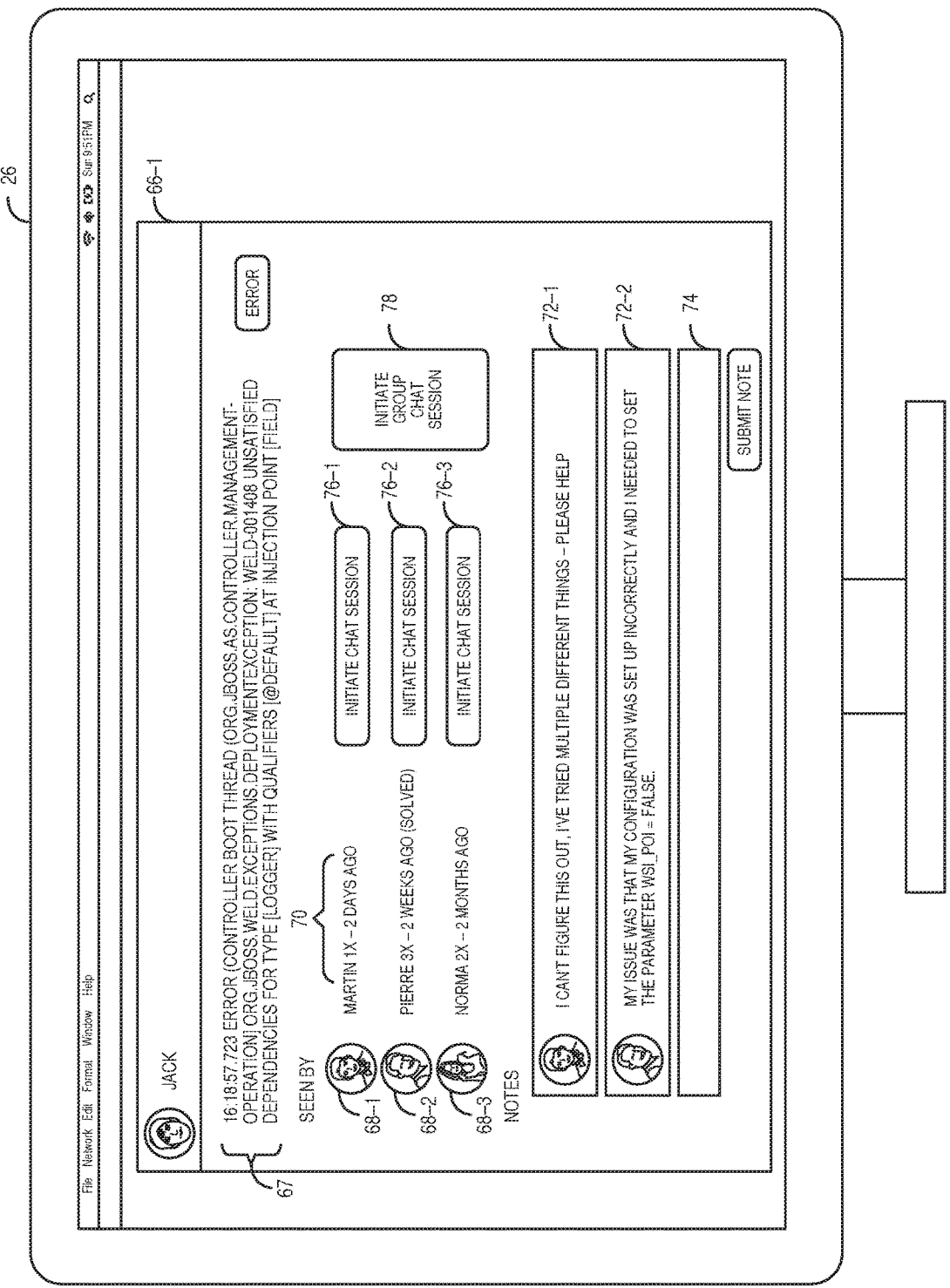
FIG. 3A illustrates a user interface provided to a user on a display device for facilitating a real-time communication session, according to one example.

FIG. 3A illustrates a user interface 66-1 provided to the user 18-1 by the processor device 20 on the display device 26 for facilitating a real-time communication session, according to one example. The user interface 66-1 depicts an exception 67 encountered by the user 18-1 during the software development session. Upon occurrence of the exception 67, the computing device 12-1 may perform the process described above with regard to FIG. 2. Based on the response received from the CER computing device 14, the user interface 66-1 depicts a plurality of user icons 68-1, 68-2, 68-3 of the other users 18 identified by the CER computing device 14 as having encountered the same exception. The user interface 66-1 may also contain text 70, received from the CER computing device 14, that identifies, for each of the other users 18, the number of times such users have encountered the exception, and the most recent time each of the other users 18 encountered the exception. The text 70 may also indicate whether the other users 18 solved the exception. The user interface 66-1 may also include one or more note fields 72-1-72-2 that contain notes, received from the CER computing device 14, of other users 18. The user interface 66-1 may also contain a user note control 74 that allows the user 18-1 to input a note. If the user 18 inputs a note, the computing device 12-1 may provide the note to the CER computing device 14 for storage in the appropriate notes field 62-3 of the user entry 60 associated with the user 18-1.

The user interface 66-1 may also present a plurality of chat controls 76-1-76-3 to facilitate a real-time communication session between the user 18-1 and the other users 18 who have encountered the same exception. For example, user selection of the chat control 76-1 by the user 18-1 initiates a real-time communication session in the form of a chat session with the other user 18 named Martin. The user interface 66-1 may also present a group chat control 78 which, upon selection by the user 18-1, initiates a real-time communication session in the form of a group chat session between the user 18-1 and the other users 18, Martin, Pierre, and Norma, who have all encountered the same exception. While for purposes of illustration a real-time communication session in the form of a chat session is illustrated, the examples are not limited to real-time communication sessions, and may also facilitate asynchronous communication sessions, such as an email communication session. Moreover, where the examples facilitate a real-time communication session, the examples are not limited to chat sessions, and can utilize any dynamic, real-time communication mechanism that facilitates real-time communications, such as a phone call.

Figure 3B:
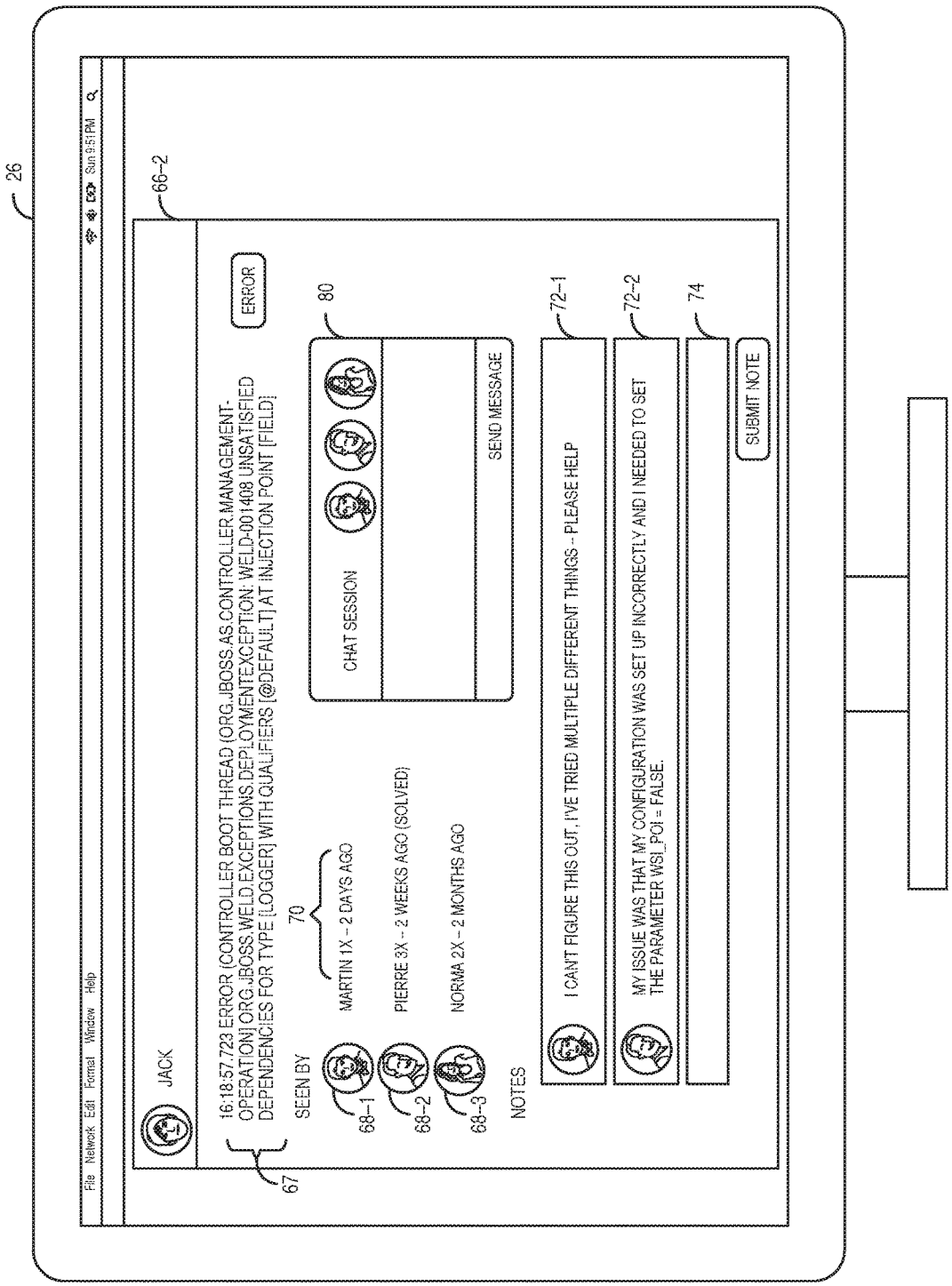
FIG. 3B illustrates a user interface provided to a user on a display device for facilitating a real-time communication session, according to another example.

FIG. 3B illustrates a user interface 66-2 provided to the user 18-1 by the processor device 20 on the display device 26 for facilitating a real-time communication session, according to one example. The user interface 66-2 is substantially similar to the user interface 66-1 illustrated above in FIG. 3A, however, in this example, the processor device 20 facilitates the real-time communication session between the user 18-1 and the other users 18 by automatically initiating, without user input from the user 18-1, a group chat session 80 that includes the user 18-1 and the plurality of other users 18, including Martin, Pierre, and Norma in this example.

Figure 4:
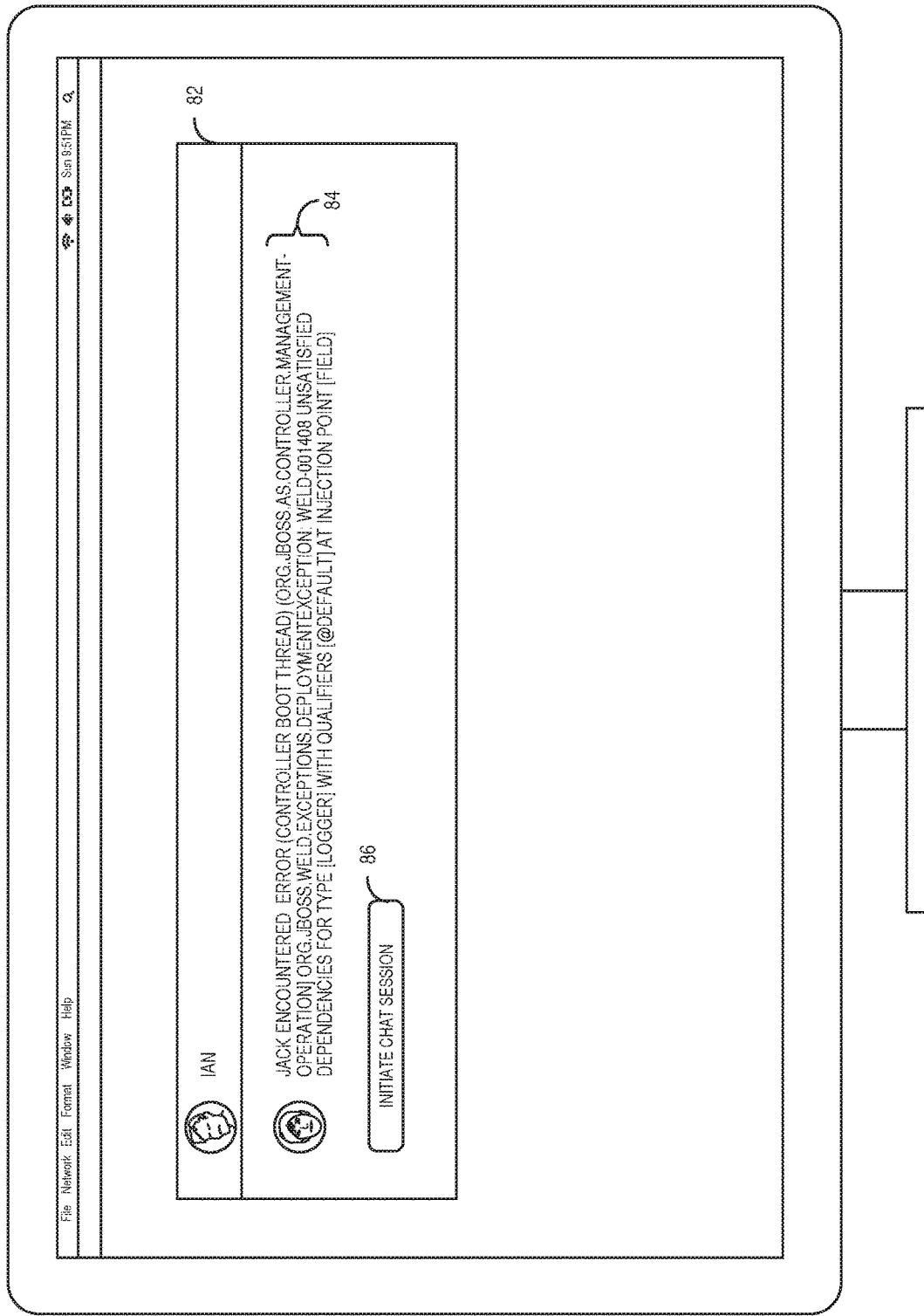
FIG. 4 illustrates a user interface that may be presented on another computing device of a specialist user, according to one example.

FIG. 4 illustrates a user interface 82 that may be presented on another computing device 12 of a specialist user 18, according to one example. In this example, in response to the receipt of the information 36 from the computing device 12-1, the CER computing device 14 determines that a specialist user 18 named Ian has been identified as a specialist who is to be contacted in the event of an occurrence of an exception by the user 18-1. This information may be provided by the computing device 12-1 in the information 36, or may be preconfigured into the CER computing device 14. The CER computing device 14 may provide the response described above to the computing device 12-1, including the information sufficient to facilitate a communication session between the user 18-1 and the other users 18 who have received the same exception. The CER computing device 14 may also send a message to a computing device 12, such as the computing device 12-N, associated with the user 18-N who is a specialist.

The computing device 12-N displays, to the user 18-N, a message 84 indicating that the user 18-1 has encountered an exception and text that describes the particular exception. The user interface 82 may also facilitate a real-time communication session between the user 18-N and the user 18-1 by providing a chat control 86, which, if selected by the user 18-N, will initiate a real-time communication session in the form of a chat session with the user 18-1. In an alternative example, the computing device 12-N may automatically, without user input from the user 18-N, initiate a chat session between the user 18-N and the user 18-1. Among other advantages, this example allows specialists to monitor exceptions of other users 18, and upon notification of an exception, proactively reach out and aid the other users 18 to resolve the exception.

Figure 5:
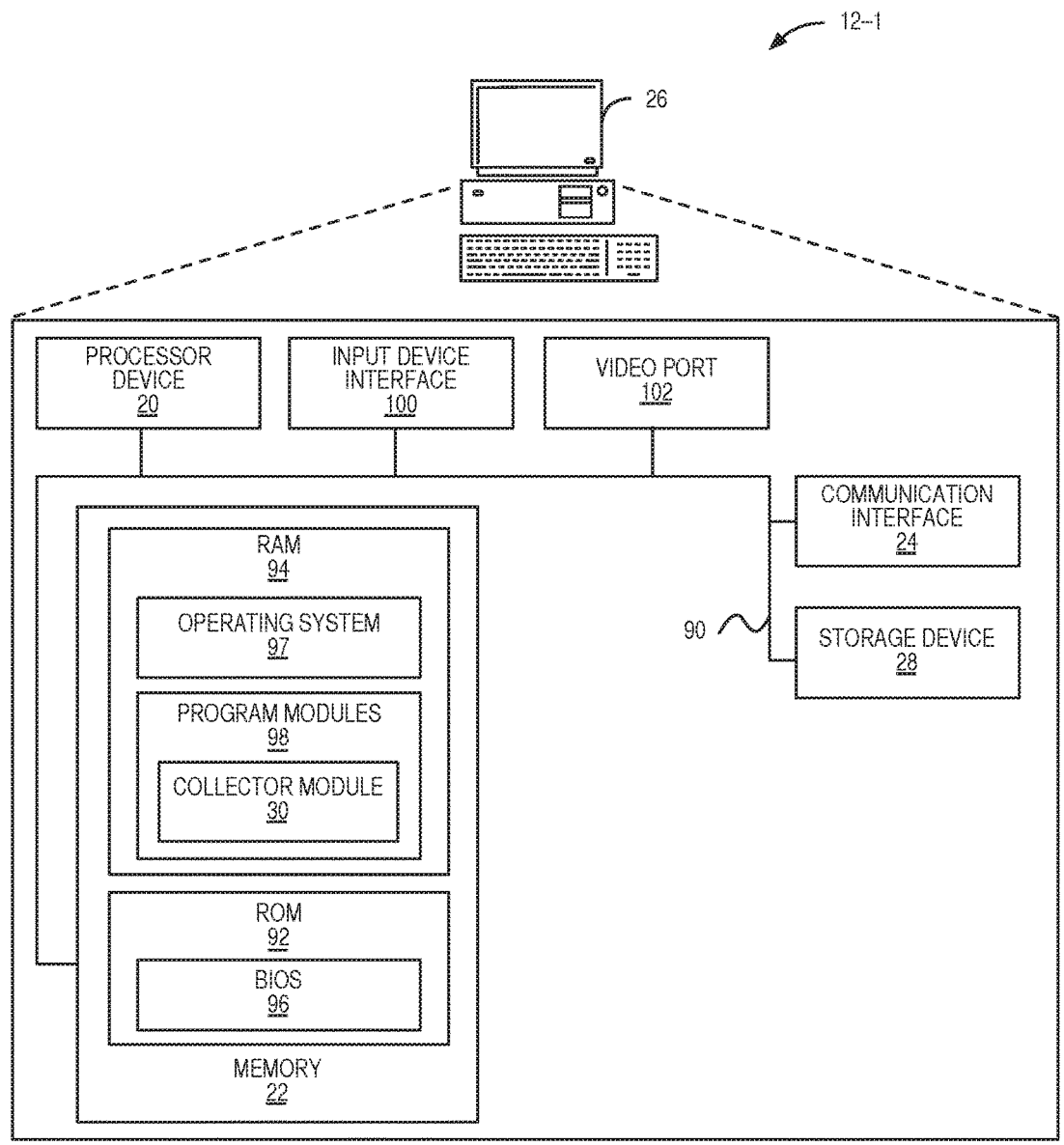
FIG. 5 is a block diagram of a computing device suitable for implementing examples, according to one example.

FIG. 5 is a block diagram of the computing device 12-1 suitable for implementing examples, according to one example. The computing device 12-1 may comprise any computing or electronic device capable of including firmware, hardware, and/or executing software instructions to implement the functionality described herein, such as a computer server, a desktop computing device, a laptop computing device, a smartphone computing tablet, or the like. The computing device 12-1 includes the processor device 20, the system memory 22, and a system bus 90. The system bus 90 provides an interface for system components including, but not limited to, the system memory 22 and the processor device 20. The processor device 20 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The system memory 22 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the computing device 12-1. The volatile memory 94 may also include a high-speed RAM, such as static RAM, for caching data.

The computing device 12-1 may further include or be coupled to a non-transitory computer-readable storage medium such as the storage device 28, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 28 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and further, that any such media may contain computer-executable instructions for performing novel methods of the disclosed examples.

A number of modules can be stored in the storage device 28 and in the volatile memory 94, including an operating system 97 and one or more program modules 98, such as the collector module 30, which may implement the functionality described herein in whole or in part. It is to be appreciated that the examples can be implemented with various commercially available operating systems 97 or combinations of operating systems 97.

A number of modules can be stored in the storage device 28 and in the volatile memory 94, including, by way of non-limiting example, the collector module 30. All or a portion of the examples may be implemented as a computer program product stored on a transitory or non-transitory computer-usable or computer-readable storage medium, such as the storage device 28, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20. The processor device 20, in conjunction with the collector module 30 in the volatile memory 94, may serve as a controller, or control system, for the computing device 12-1 that is to implement the functionality described herein.

An operator, such as the user 18-1, may also be able to enter one or more commands through a keyboard (not illustrated), a pointing device such as a mouse (not illustrated), or a touch-sensitive surface such as the display device 26. Such input devices may be connected to the processor device 20 through an input device interface 100 that is coupled to the system bus 90 but can be connected by other interfaces such as a parallel port, an Institute of Electrical and Electronic Engineers (IEEE) 1394 serial port, a Universal Serial Bus (USB) port, an IR interface, and the like.

The computing device 12-1 may also include the communication interface 24 suitable for communicating with the network 16 as appropriate or desired. The computing device 12-1 may also include a video port 102 configured to interface with the display device 26 to provide information to the user 18-1.

The CER computing device 14, in one example, may contain similar components to the computing device 12-1 as discussed above, however, the program modules in the memory would comprise the exception parser module 52 and the response generation module 54.

Figure 6:
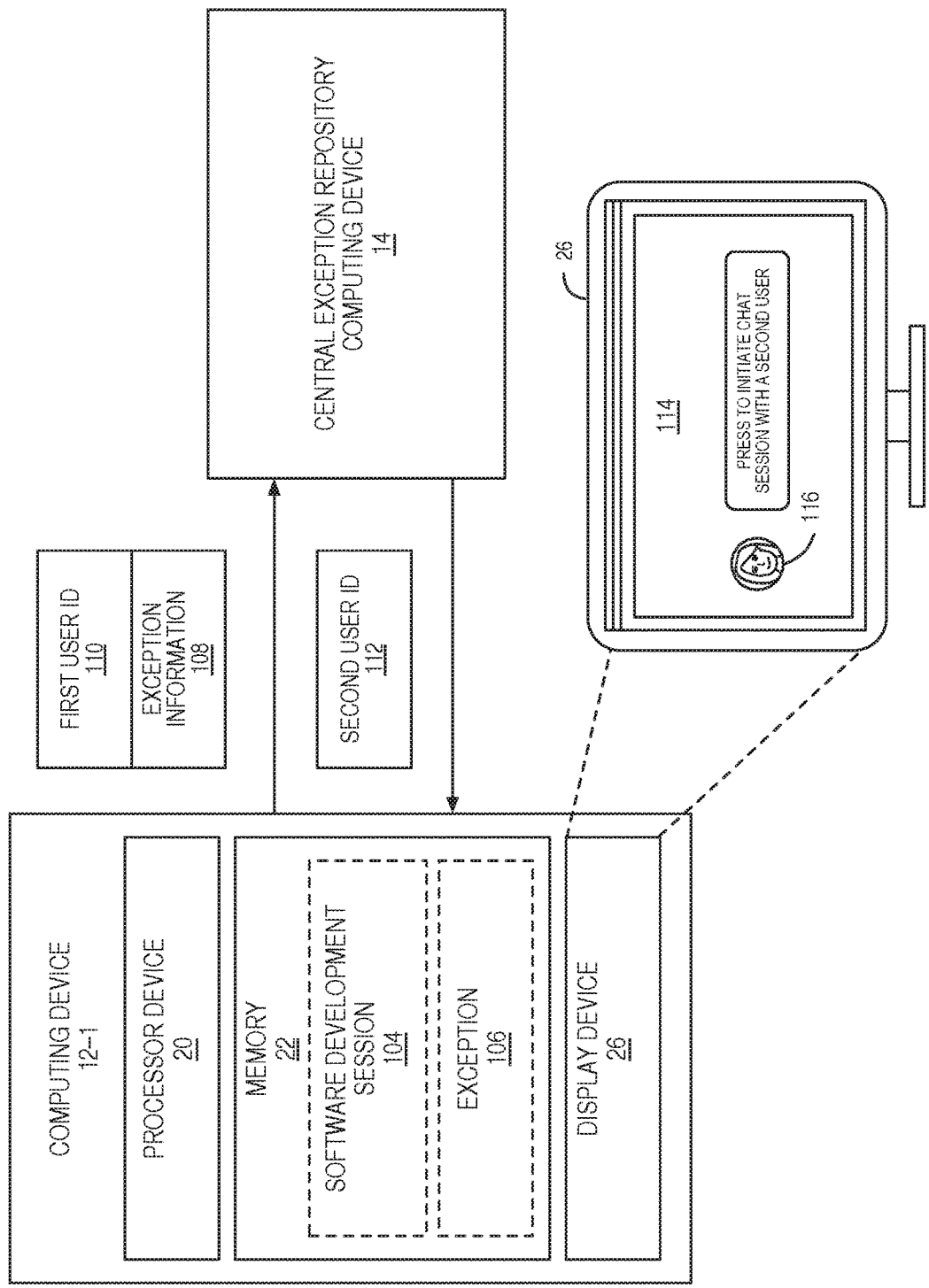
FIG. 6 is a block diagram of the computing device suitable for implementing examples, according to another example.

FIG. 6 is a block diagram of the computing device 12-1 suitable for implementing examples, according to another example. The computing device 12-1 includes the processor device 20 and the memory 22. The computing device 12-1 monitors a software development session 104 of the user 18-1 (not illustrated). An exception 106 is detected during the software development session 104. In response to detecting the exception, the computing device 12-1 provides, to the central exception repository computing device 14, information regarding the exception. The information comprises exception information 108 that identifies the exception 106 and a first user identifier 110 that identifies the user 18-1. The computing device 12-1 receives, from the central exception repository computing device 14, a second user identifier 112 that identifies a second user who has encountered a same exception. The computing device 12-1 presents, via a user interface 114 on the display device 26 coupled to the computing device 12-1, information 116 to the first user that identifies the second user, and facilitates a communication session between the first user and the second user.

Individuals will recognize improvements and modifications to the preferred examples of the disclosure. All such improvements and modifications are considered within the scope of the concepts disclosed herein and the claims that follow.

What is claimed is:
1. A method comprising:
    monitoring, by a computing device comprising a processor device, a software development session of a first user;
    detecting, by the computing device, an exception during the software development session;

providing, by the computing device to a central exception repository computing device, information regarding the exception, the information comprising exception information that identifies the exception and a first user identifier that identifies the first user;

receiving, from the central exception repository computing device, a plurality of user identifiers that identify a plurality of corresponding users who have encountered a same exception as the exception;

presenting, via a user interface on a display device coupled to the computing device, information to the first user that identifies each of the plurality of corresponding users; and presenting, in the user interface, individual chat controls in conjunction with the information that identifies each of the plurality of corresponding users, activation by the first user of any of the individual chat controls initiating a chat session between the first user and a corresponding user in order to resolve the exception.

2. The method of claim 1 wherein detecting the exception during the software development session comprises:

accessing a logfile generated by a development module; and determining that an entry in the logfile identifies the exception.

3. The method of claim 1 wherein receiving the plurality of user identifiers that identify the plurality of corresponding users who have encountered the same exception as the exception further comprises:

receiving a user note generated by at least one of the plurality of corresponding users regarding the exception; and wherein presenting, via the user interface, the information to the first user that identifies each of the plurality of corresponding users further comprises presenting, via the user interface, the information to the first user that identifies each of the plurality of corresponding users and presenting, via the user interface, the user note generated by the at least one of the plurality of corresponding users.

4. The method of claim 1 further comprising:

determining a current date and time;

accessing environmental information that identifies a current operating environment of the computing device; and wherein providing, to the central exception repository computing device, the information regarding the exception further comprises providing, to the central exception repository computing device, the information regarding the exception, the current date and time, and the environmental information that identifies the current operating environment of the computing device.

5. The method of claim 1 further comprising:

receiving, via the user interface, a user note regarding the exception; and providing the user note to the central exception repository computing device.

6. The method of claim 1 wherein presenting, in the user interface, individual chat controls in conjunction with the information that identifies each of the plurality of corresponding users that, upon activation by the first user, initiates a chat session between the first user and the corresponding user further comprises:

presenting, in the user interface, individual chat controls in conjunction with the information that identifies each of the plurality of corresponding users that, upon activation by the first user, initiates a chat session between the first user and the corresponding user, and a group chat control that, upon activation by the first user, initiates a group chat session between the first user and the plurality of corresponding users.

7. The method of claim 1 wherein presenting, via the user interface on the display device coupled to the computing device, information to the first user that identifies each of the plurality of corresponding users further comprises:

presenting, via the user interface on the display device coupled to the computing device, information to the first user that identifies each of the plurality of corresponding users and that identifies when each of the plurality of corresponding users encountered the same exception as the exception.

8. The method of claim 1 wherein presenting, via the user interface on the display device coupled to the computing device, information to the first user that identifies each of the plurality of corresponding users further comprises:

presenting, via the user interface on the display device coupled to the computing device, information to the first user that identifies each of the plurality of corresponding users, and identifies a number of times each of the plurality of corresponding users encountered the same exception as the exception.

9. The method of claim 1 further comprising:

receiving, by the computing device via the user interface, an input selecting a particular individual chat control;

determining the user corresponding to the individual chat control; and initiating a chat session with the user corresponding to the individual chat control.

10. A computing device comprising:

a memory; and a processor device coupled to the memory to:

monitor a software development session of a first user;

detect an exception during the software development session;

provide, to a central exception repository computing device, information regarding the exception, the information comprising exception information that identifies the exception and a first user identifier that identifies the first user;

receive, from the central exception repository computing device, a plurality of user identifiers that identify a plurality of corresponding users who have encountered a same exception as the exception;

present, via a user interface on a display device coupled to the computing device, information to the first user that identifies each of the plurality of corresponding users; and present, in the user interface, individual chat controls in conjunction with the information that identifies each of the plurality of corresponding users, activation by the first user of any of the individual chat controls initiating a chat session between the first user and a corresponding user in order to resolve the exception.

11. The computing device of claim 10 wherein to detect the exception during the software development session, the processor device is further to:

access a logfile generated by a development module; and determine that an entry in the logfile identifies the exception.

12. A computer program product stored on a non-transitory computer-readable storage medium and including instructions to cause a processor device to:

monitor a software development session of a first user;

detect an exception during the software development session;

provide, to a central exception repository computing device, information regarding the exception, the information comprising exception information that identifies the exception and a first user identifier that identifies the first user;

receive, from the central exception repository computing device, a plurality of user identifiers that identify a plurality of corresponding users who have encountered a same exception as the exception;

present, via a user interface on a display device coupled to a computing device, information to the first user that identifies each of the plurality of corresponding users; and present, in the user interface, individual chat controls in conjunction with the information that identifies each of the plurality of corresponding users, activation by the first user of any of the individual chat controls initiating a chat session between the first user and a corresponding user in order to resolve the exception.

13. The computer program product of claim 12 wherein to detect the exception during the software development session the instructions further cause the processor device to:

access a logfile generated by a development module; and
determine that an entry in the logfile identifies the exception.

* * * * *